(12) United States Patent
Tomioka

(10) Patent No.: US 7,633,515 B2
(45) Date of Patent: Dec. 15, 2009

(54) EXPOSURE APPARATUS

(75) Inventor: Yasuhiro Tomioka, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 11/673,666

(22) Filed: Feb. 12, 2007

(65) Prior Publication Data

US 2007/0188590 A1    Aug. 16, 2007

(30) Foreign Application Priority Data

Feb. 14, 2006    (JP)    ............................. 2006-037106

(51) Int. Cl.
G02B 26/00    (2006.01)
B41J 2/44    (2006.01)

(52) U.S. Cl. .................................................... 347/247
(58) Field of Classification Search .................. 347/236, 347/237, 246, 247
See application file for complete search history.

(56) References Cited

FOREIGN PATENT DOCUMENTS

JP    9-197316    7/1997

OTHER PUBLICATIONS

Computer-generated translation of JP 9-197316, published on Jul. 31, 1997, cited in the IDS filed on Feb. 12, 2007.*

* cited by examiner

*Primary Examiner*—Huan H Tran
(74) *Attorney, Agent, or Firm*—Fitzpatrick, Cella, Harper & Scinto

(57) ABSTRACT

In an exposure apparatus employing an over filled optical system, the light quantity distribution on a scanning plane is kept nearly constant for a plurality of scanning light quantities. It selects the light quantity of the light beam irradiated onto the photosensitive body from a plurality of levels, and sets the light quantity selected. According to the light quantity, it selects one of a plurality of correction current profiles, and supplies a light source with a current passing through the correction based on the correction current profile selected. Since the light quantity of the light beam irradiated onto the photosensitive body is corrected by the correction current, the light quantity of the light beam on the photosensitive body becomes nearly constant in the scanning direction.

3 Claims, 18 Drawing Sheets

| | ADDRESS | MEMORY DATA | OUTPUT VOLTAGE (V) | RS SUPPLY CURRENT (μA) | PRE-CORRECTION LIGHT QUANTITY (mW) | POST-CORRECTION LIGHT QUANTITY (mW) | |
|---|---|---|---|---|---|---|---|
| 1 | 0000h | 00000011 | 0.03 | 0.03 | 1.23 | 1.2 | |
| 2 | 0001h | 00001001 | 0.09 | 0.09 | 1.29 | 1.2 | |
| 3 | 0002h | 00001111 | 0.15 | 0.15 | 1.35 | 1.2 | |
| ⋮ | ⋮ | ⋮ | ⋮ | ⋮ | ⋮ | ⋮ | |
| 16 | 000Fh | 00110110 | 0.54 | 0.54 | 1.74 | 1.2 | |
| 17 | 0010h | 00110110 | 0.54 | 0.54 | 1.74 | 1.2 | LIGHT QUANTITY SETTING 1 |
| 18 | 0011h | 00110110 | 0.54 | 0.54 | 1.74 | 1.2 | |
| ⋮ | ⋮ | ⋮ | ⋮ | ⋮ | ⋮ | ⋮ | |
| 30 | 001Dh | 00001111 | 0.15 | 0.15 | 1.35 | 1.2 | |
| 31 | 001Eh | 00001001 | 0.09 | 0.09 | 1.29 | 1.2 | |
| 32 | 001Fh | 00000011 | 0.03 | 0.03 | 1.23 | 1.2 | |
| 1 | 0020h | 00010110 | 0.22 | 0.22 | 1.23 | 1 | |
| 2 | 0021h | 00011010 | 0.26 | 0.26 | 1.26 | 1 | |
| 3 | 0022h | 00011101 | 0.29 | 0.29 | 1.29 | 1 | |
| 4 | 0023h | 00100000 | 0.32 | 0.32 | 1.32 | 1 | |
| 5 | 0024h | 00100011 | 0.35 | 0.35 | 1.35 | 1 | |
| ⋮ | ⋮ | ⋮ | ⋮ | ⋮ | ⋮ | ⋮ | |
| 17 | 0030h | 00111111 | 0.63 | 0.63 | 1.64 | 1 | |
| 18 | 0031h | 01000001 | 0.65 | 0.65 | 1.655 | 1 | LIGHT QUANTITY SETTING 2 |
| ⋮ | ⋮ | ⋮ | ⋮ | ⋮ | ⋮ | ⋮ | |
| 31 | 003Eh | 01001010 | 0.74 | 0.74 | 1.74 | 1 | |
| 32 | 003Fh | 01001010 | 0.74 | 0.74 | 1.74 | 1 | |
| 33 | 0040h | 01001010 | 0.74 | 0.74 | 1.74 | 1 | |
| ⋮ | ⋮ | ⋮ | ⋮ | ⋮ | ⋮ | ⋮ | |
| 61 | 005Ch | 00011101 | 0.29 | 0.29 | 1.29 | 1 | |
| 62 | 005Dh | 00011010 | 0.26 | 0.26 | 1.26 | 1 | |
| 63 | 005Eh | 00010110 | 0.22 | 0.22 | 1.23 | 1 | |

| | LIGHT QUANTITY ON DRUM SURFACE (uW) | PRE-CORRECTION LIGHT QUANTITY (uW) | POST-CORRECTION LIGHT QUANTITY (uW) | CORRECTION CURRENT AMOUNT (uA) | CORRECTION VOLTAGE (TARGET) | Vref = 0.075 | | Vref = 0.01 | |
|---|---|---|---|---|---|---|---|---|---|
| | | | | | | DATA | VOLTAGE (1111B) | DATA | VOLTAGE (0010B) |
| 1 | 250 | 315.000 | 65.000 | 81.250 | 186.875 | 2 | 150 | 19 | 190 |
| 2 | 250 | 337.500 | 87.500 | 109.375 | 251.562 | 3 | 225 | 25 | 250 |
| 3 | 250 | 352.500 | 102.500 | 128.125 | 294.687 | 4 | 300 | 29 | 290 |
| 4 | 250 | 363.750 | 133.750 | 142.187 | 327.031 | 4 | 300 | 33 | 330 |
| 5 | 250 | 372.750 | 122.750 | 153.437 | 352.906 | 5 | 375 | 35 | 350 |
| 6 | 250 | 380.250 | 130.250 | 162.812 | 374.467 | 5 | 375 | 37 | 370 |
| 7 | 250 | 386.678 | 136.678 | 170.847 | 392.948 | 5 | 375 | 39 | 390 |
| 8 | 250 | 392.302 | 142.302 | 177.877 | 409.118 | 5 | 375 | 41 | 410 |
| 9 | 250 | 397.300 | 147.300 | 184.125 | 423.488 | 6 | 450 | 42 | 420 |
| 10 | 250 | 401.797 | 151.797 | 189.746 | 436.417 | 6 | 450 | 44 | 440 |
| 11 | 250 | 405.882 | 155.882 | 194.853 | 448.161 | 6 | 450 | 45 | 450 |
| 12 | 250 | 409.621 | 159.621 | 199.527 | 458.911 | 6 | 450 | 46 | 460 |
| 13 | 250 | 413.062 | 163.062 | 203.828 | 468.804 | 6 | 450 | 47 | 470 |
| 14 | 250 | 416.238 | 166.238 | 207.797 | 477.934 | 6 | 450 | 48 | 480 |
| 15 | 250 | 419.165 | 169.165 | 211.456 | 486.349 | 6 | 450 | 49 | 490 |
| 16 | 250 | 421.839 | 171.839 | 214.799 | 494.038 | 7 | 525 | 49 | 490 |
| 17 | 250 | 424.226 | 174.226 | 217.782 | 500.899 | 7 | 525 | 50 | 500 |
| 18 | 250 | 426.235 | 176.235 | 220.293 | 506.675 | 7 | 525 | 51 | 510 |
| 19 | 250 | 427.676 | 177.676 | 222.095 | 510.819 | 7 | 525 | 51 | 510 |
| 20 | 250 | 428.177 | 178.177 | 222.722 | 512.260 | 7 | 525 | 51 | 510 |
| 21 | 250 | 428.177 | 178.177 | 222.722 | 512.260 | 7 | 525 | 51 | 510 |
| 22 | 250 | 727.676 | 177.676 | 222.095 | 510.819 | 7 | 525 | 51 | 510 |
| 23 | 250 | 426.235 | 176.235 | 220.293 | 506.675 | 7 | 525 | 50 | 500 |
| 24 | 250 | 424.226 | 174.226 | 217.782 | 500.899 | 7 | 525 | 49 | 490 |
| 25 | 250 | 421.839 | 171.839 | 214.799 | 494.038 | 6 | 450 | 49 | 490 |
| 26 | 250 | 419.165 | 169.165 | 211.456 | 486.349 | 6 | 450 | 49 | 490 |
| 27 | 250 | 416.238 | 166.238 | 207.797 | 477.934 | 6 | 450 | 48 | 480 |
| 28 | 250 | 413.062 | 163.062 | 203.828 | 468.804 | 6 | 450 | 47 | 470 |
| 29 | 250 | 409.621 | 159.621 | 199.527 | 458.911 | 6 | 450 | 46 | 460 |
| 30 | 250 | 405.882 | 155.882 | 194.853 | 448.161 | 6 | 450 | 45 | 450 |
| 31 | 250 | 401.797 | 151.797 | 189.746 | 436.417 | 6 | 450 | 44 | 440 |
| 32 | 250 | 397.300 | 147.300 | 184.125 | 423.488 | 6 | 450 | 42 | 420 |
| 33 | 250 | 392.302 | 142.302 | 177.877 | 409.118 | 5 | 357 | 41 | 410 |
| 34 | 250 | 386.678 | 136.678 | 170.847 | 392.948 | 5 | 357 | 39 | 390 |
| 35 | 250 | 380.250 | 130.250 | 162.812 | 374.467 | 5 | 357 | 37 | 370 |
| 36 | 250 | 372.750 | 122.750 | 153.437 | 352.906 | 5 | 357 | 35 | 350 |
| 37 | 250 | 363.750 | 113.750 | 142.187 | 327.031 | 4 | 300 | 33 | 330 |
| 38 | 250 | 352.500 | 102.500 | 128.125 | 294.687 | 4 | 300 | 29 | 290 |
| 39 | 250 | 337.500 | 87.500 | 109.375 | 251.562 | 3 | 225 | 25 | 250 |
| 40 | 250 | 315.000 | 65.000 | 81.250 | 186.875 | 2 | 150 | 19 | 190 |

| Vref SETTING ||  MAXIMUM OUTPUT VOLTAGE |
|---|---|---|
| Vref REGISTER SETTING | ONE UNIT OUTPUT VOLTAGE | (mV) |
| 0000 | 0mV | 0 |
| 0001 | 5mV | 320 |
| 0010 | 10mV | 640 |
| 0011 | 15mV | 960 |
| 0100 | 20mV | 1280 |
| 0101 | 25mV | 1600 |
| 0110 | 30mV | 1920 |
| 0111 | 35mV | 2240 |
| 1000 | 40mV | 2560 |
| 1001 | 45mV | 2880 |
| 1010 | 50mV | 3200 |
| 1011 | 55mV | 3520 |
| 1100 | 60mV | 3840 |
| 1101 | 65mV | 4160 |
| 1110 | 70mV | 4480 |
| 1111 | 75mV | 4800 |

FIG.11

| | ADDRESS | MEMORY DATA | OUTPUT VOLTAGE (mV) | RS SUPPLY CURRENT (μA) | PRE-CORRECTION LIGHT QUANTITY (mW) | POST-CORRECTION LIGHT QUANTITY (mW) | |
|---|---|---|---|---|---|---|---|
| 1 | 0000h | 010011 | 190 | 83 | 315 | 249 | |
| 2 | 0001h | 011001 | 250 | 109 | 338 | 251 | |
| 3 | 0002h | 011101 | 290 | 126 | 353 | 252 | |
| ⋮ | ⋮ | ⋮ | ⋮ | ⋮ | ⋮ | ⋮ | |
| 16 | 000Fh | 110001 | 490 | 213 | 422 | 251 | |
| 17 | 0010h | 110001 | 490 | 213 | 422 | 251 | LIGHT QUANTITY SETTING 1 Vref=10mV |
| 18 | 0011h | 110001 | 490 | 213 | 419 | 249 | |
| ⋮ | ⋮ | ⋮ | ⋮ | ⋮ | ⋮ | ⋮ | |
| 30 | 001Dh | 011101 | 290 | 126 | 353 | 252 | |
| 31 | 001Eh | 011001 | 250 | 109 | 338 | 251 | |
| 32 | 001Fh | 010011 | 190 | 83 | 315 | 249 | |
| 1 | 0020h | 010101 | 420 | 183 | 315 | 169 | |
| 2 | 0021h | 010111 | 460 | 200 | 327 | 167 | |
| 3 | 0022h | 011000 | 480 | 209 | 338 | 171 | |
| 4 | 0023h | 011001 | 500 | 217 | 347 | 173 | |
| 5 | 0024h | 011010 | 520 | 226 | 353 | 172 | |
| ⋮ | ⋮ | ⋮ | ⋮ | ⋮ | ⋮ | ⋮ | |
| 17 | 0030h | 100001 | 660 | 287 | 397 | 168 | LIGHT QUANTITY SETTING 2 Vref=20mV |
| 18 | 0031h | 100001 | 660 | 287 | 399 | 169 | |
| ⋮ | ⋮ | ⋮ | ⋮ | ⋮ | ⋮ | ⋮ | |
| 31 | 003Eh | 100100 | 720 | 313 | 422 | 172 | |
| 32 | 003Fh | 100100 | 720 | 313 | 422 | 172 | |
| 33 | 0040h | 100100 | 720 | 313 | 422 | 172 | |
| ⋮ | ⋮ | ⋮ | ⋮ | ⋮ | ⋮ | ⋮ | |
| 61 | 005Ch | 011001 | 480 | 209 | 338 | 171 | |
| 62 | 005Dh | 011001 | 460 | 200 | 327 | 167 | |
| 63 | 005Eh | 011001 | 420 | 183 | 315 | 169 | |

FIG.14

<TARGET:250uW>     Vref=0.01

| | PRE-CORRECTION LIGHT QUANTITY (uW) | DATA | CORRECTION VOLTAGE mV | CORRECTION CURRENT AMOUNT uA | CORRECTION LIGHT QUANTITY uW | LIGHT QUANTITY ON DRUM SURFACE uW |
|---|---|---|---|---|---|---|
| 1 | 315 | 30 | 300 | 81 | 65 | 250 |
| 2 | 335 | 39 | 390 | 105 | 84 | 251 |
| 3 | 348 | 45 | 450 | 122 | 97 | 251 |
| 4 | 358 | 50 | 500 | 135 | 108 | 250 |
| 5 | 366 | 54 | 540 | 146 | 117 | 249 |
| 6 | 372 | 57 | 570 | 154 | 123 | 249 |
| 7 | 378 | 59 | 590 | 159 | 128 | 250 |
| 8 | 382 | 61 | 610 | 165 | 132 | 250 |
| 9 | 384 | 62 | 620 | 168 | 134 | 250 |
| 10 | 385 | 62 | 620 | 168 | 134 | 251 |
| 11 | 385 | 62 | 620 | 168 | 134 | 251 |
| 12 | 384 | 62 | 620 | 168 | 134 | 250 |
| 13 | 382 | 61 | 610 | 165 | 132 | 250 |
| 14 | 378 | 59 | 590 | 159 | 128 | 250 |
| 15 | 372 | 57 | 570 | 154 | 123 | 249 |
| 16 | 366 | 54 | 540 | 146 | 117 | 249 |
| 17 | 358 | 50 | 500 | 135 | 108 | 250 |
| 18 | 348 | 45 | 450 | 122 | 97 | 251 |
| 19 | 335 | 39 | 390 | 105 | 84 | 251 |
| 20 | 315 | 30 | 300 | 81 | 65 | 250 |

FIG.16

<TARGET:150uW>   Vref=0.006

| | PRE-CORRECTION LIGHT QUANTITY (uW) | DATA | CORRECTION VOLTAGE mV | CORRECTION CURRENT AMOUNT uA | CORRECTION LIGHT QUANTITY uW | LIGHT QUANTITY ON DRUM SURFACE uW |
|---|---|---|---|---|---|---|
| 1 | 189 | 30 | 180 | 49 | 39 | 150 |
| 2 | 201 | 39 | 234 | 63 | 51 | 150 |
| 3 | 209 | 45 | 270 | 73 | 58 | 151 |
| 4 | 215 | 50 | 300 | 81 | 65 | 150 |
| 5 | 220 | 54 | 324 | 88 | 70 | 150 |
| 6 | 223 | 57 | 342 | 92 | 74 | 150 |
| 7 | 227 | 59 | 354 | 96 | 77 | 150 |
| 8 | 229 | 61 | 366 | 99 | 79 | 150 |
| 9 | 231 | 62 | 372 | 101 | 80 | 150 |
| 10 | 231 | 62 | 372 | 101 | 80 | 150 |
| 11 | 231 | 62 | 372 | 101 | 80 | 150 |
| 12 | 231 | 62 | 372 | 101 | 80 | 150 |
| 13 | 229 | 61 | 366 | 99 | 79 | 150 |
| 14 | 227 | 59 | 354 | 96 | 77 | 150 |
| 15 | 223 | 57 | 342 | 92 | 74 | 150 |
| 16 | 220 | 54 | 324 | 88 | 70 | 150 |
| 17 | 215 | 50 | 300 | 81 | 65 | 150 |
| 18 | 209 | 45 | 270 | 73 | 58 | 151 |
| 19 | 201 | 39 | 234 | 63 | 51 | 150 |
| 20 | 189 | 30 | 180 | 49 | 39 | 150 |

FIG.17

<TARGET:300uW>    Vref=0.012

| | PRE-CORRECTION LIGHT QUANTITY (uW) | DATA | CORRECTION VOLTAGE mV | CORRECTION CURRENT AMOUNT uA | CORRECTION LIGHT QUANTITY uW | LIGHT QUANTITY ON DRUM SURFACE uW |
|---|---|---|---|---|---|---|
| 1 | 378 | 30 | 360 | 97 | 78 | 300 |
| 2 | 402 | 39 | 468 | 126 | 101 | 301 |
| 3 | 418 | 45 | 540 | 146 | 117 | 301 |
| 4 | 430 | 50 | 600 | 162 | 130 | 300 |
| 5 | 439 | 54 | 648 | 175 | 140 | 299 |
| 6 | 447 | 57 | 684 | 185 | 148 | 299 |
| 7 | 453 | 59 | 708 | 191 | 153 | 300 |
| 8 | 458 | 61 | 732 | 198 | 158 | 300 |
| 9 | 461 | 62 | 744 | 201 | 161 | 300 |
| 10 | 462 | 62 | 744 | 201 | 161 | 301 |
| 11 | 462 | 62 | 744 | 201 | 161 | 301 |
| 12 | 461 | 62 | 744 | 201 | 161 | 300 |
| 13 | 458 | 61 | 732 | 198 | 158 | 300 |
| 14 | 453 | 59 | 708 | 191 | 153 | 300 |
| 15 | 447 | 57 | 684 | 185 | 148 | 299 |
| 16 | 439 | 54 | 648 | 175 | 140 | 299 |
| 17 | 430 | 50 | 600 | 162 | 130 | 300 |
| 18 | 418 | 45 | 540 | 146 | 117 | 301 |
| 19 | 402 | 39 | 468 | 126 | 101 | 301 |
| 20 | 378 | 30 | 360 | 97 | 78 | 300 |

FIG.18

EXPOSURE APPARATUS

BACKGROUND OF THE INVENTION

1. Field of the Invention

The present invention relates to an exposure apparatus, and more particularly to an exposure apparatus for exposing a photosensitive body by carrying out the main scanning of the photosensitive body by deflecting a light beam emitted from a light source.

2. Description of Related Art

Exposure apparatuses have conventionally been employed in image forming apparatuses such as copying machines, fax machines and laser printers. Such an exposure apparatus carries out the main scanning of the surface of a drum-like photosensitive body with a laser beam corresponding to image information using a light deflecting means such as a polygon mirror, and carries out subscanning by rotating the photosensitive body in the subscanning direction. Thus, an electrostatic latent image corresponding to the image information is formed on the photosensitive body.

Recently, since the printing speed of the image forming apparatuses has increased, the polygon mirror rotation rate in an under filled optical system is reaching its limit. Accordingly, over filled optical systems have been employed. In the over filled optical system, the laser beam is incident upon a plurality of reflection planes of a polygon mirror simultaneously by making the scanning direction length of the individual reflection planes of the polygon mirror smaller than the scanning direction diameter of the laser beam incident upon the polygon mirror. Compared with the under filled optical system, the over filled optical system can greatly reduce the scanning direction length of the reflection planes required for producing a prescribed magnitude spotlight on the photosensitive body. In addition, the over filled optical system can provide a greater number of reflection planes to the polygon mirror of the same diameter than the under filled optical system. Thus, the over filled optical system can rotate the polygon mirror at a lower speed than the under filled optical system. Besides, the over filled optical system can employ a polygon mirror driving unit with smaller power consumption.

In the over filled optical system, however, each reflection plane of the polygon mirror reflects part of the incident laser beam as described before. Accordingly, the light quantity incident upon the reflection plane of the polygon mirror varies depending on the angle of the polygon mirror. FIG. 10 is a graph showing the conditions. The distribution of the light quantity incident upon the photosensitive body is as illustrated in FIG. 10. More specifically, the light quantity takes the highest value at the center of the photosensitive body, and gradually decreases toward the two edges. The variations in the light quantity distribution can have adverse effect on the image quality.

To solve the problem, Japanese patent application laid-open No. 09-197316/1997 discloses a technique that measures the light quantities at points on a scanning plane on the photosensitive body, measures fluctuations on the scanning plane, and stores the fluctuations. According to the stored values, it corrects the light quantity of the laser beam, thereby controlling the light quantity on the scanning plane in such a manner as to become nearly constant.

However, to enrich media, to improve efficiency of developing resources, or to speed up product development, it is required to apply a single exposure apparatus to a variety of apparatuses such as a laser printer or MFP (multifunction peripheral). Thus, it becomes necessary for individual exposure apparatuses to cope with various specifications.

In particular, to cope with the various specifications, this type of the exposure apparatus has a problem of the rotation rate of the polygon mirror and the laser light quantity. As for the rotation of the polygon mirror, such an apparatus that detects the rotation rate according to the detection period of a horizontal synchronizing signal detecting means and controls the rotation will be able to vary the rotation rate inexpensively and easily.

As for the laser light quantity also, the conventional under filled scanner can easily vary the light quantity by varying the target light quantity of APC (automatic power control). In contrast, the over filled optical system must carry out the light quantity correction during a single scanning.

However, as described in Japanese Patent Application Laid-open No. 09-197316/1997, the conventional apparatuses do not cope with a plurality of scanning light quantities. Thus, an exposure apparatus capable of coping with various specifications has not been implemented.

SUMMARY OF THE INVENTION

The present invention is implemented to solve the foregoing problems. It is therefore an object of the present invention to provide an exposure apparatus capable of coping with a plurality of scanning light quantities in the over filled optical system.

Another object of the present invention is to provide an exposure apparatus capable of carrying out light quantity correction in such a manner as to make the light quantity distribution nearly constant in a single scanning direction in response to a plurality of scanning light quantities.

Still another object of the present invention is to provide an exposure apparatus capable of improving the accuracy of the light quantity correction in accordance with target scanning light quantity.

Still another object of the present invention is to provide an exposure apparatus capable of easily coping with an increasing number of target scanning light quantities.

According to one aspect of the present invention, there is provided an exposure apparatus comprising: a light source for emitting a light beam with a light quantity corresponding to a current amount supplied; a rotating polygon mirror with a plurality of reflection planes, said rotating polygon mirror rotating in a manner that the light beam emitted from said light source and reflected off the reflection plane scans on a photosensitive body; beam magnifying means for expanding the light beam emitted from said light source in a manner that the light beam is irradiated onto said rotating polygon mirror with exceeding beyond a width of each reflection plane of said rotating polygon mirror in a scanning direction; correction current profile memory means for storing a plurality of correction current profiles that will provide the scanning direction with a nearly fixed light quantity of the light beam irradiated onto said photosensitive body; setting means for selecting from a plurality of levels a target light quantity of the light beam irradiated onto the photosensitive body, and for setting the target light quantity selected; and current supplying means for selecting one of the plurality of correction current profiles stored in said correction current profile memory means in response to the target light quantity set by said setting means, and for supplying said light source with a current passing through correction based on the correction current profile selected.

According to another aspect of the present invention, there is provided an exposure apparatus comprising: a light source for emitting a light beam with a light quantity corresponding to a current amount supplied; a rotating polygon mirror with a plurality of reflection planes, said rotating polygon mirror rotating in a manner that the light beam emitted from said light source and reflected off the reflection plane scans on a photosensitive body; beam magnifying means for expanding the light beam emitted from said light source in a manner that the light beam is irradiated onto said rotating polygon mirror with exceeding beyond a width of each reflection plane of said rotating polygon mirror in a scanning direction; correction current profile memory means for storing a correction current profile that will provide the scanning direction with a nearly fixed light quantity of the light beam irradiated onto said photosensitive body; setting means for selecting from a plurality of levels a target light quantity of the light beam irradiated onto the photosensitive body, and for setting the target light quantity selected; and current supplying means for generating correction information corresponding to the correction current profile stored in said correction current profile memory means in response to the target light quantity set by said setting means, and for supplying said light source with a current passing through correction in accordance with the correction information generated, at timing in response to the correction information.

According to the present invention, the light quantity distribution in the scanning direction can be made constant in response to a plurality of photosensitive body irradiation light quantities.

In addition, in accordance with a plurality of photosensitive body irradiation light quantities and a plurality of scanning speeds, the light quantity correction can be performed which can provide light quantity distribution nearly constant in the scanning direction.

Furthermore, in response to set light quantities on the photosensitive body, and in accordance with a plurality of photosensitive body irradiation light quantities and a plurality of scanning speeds, the light quantity correction can be performed which can provide light quantity distribution nearly constant in the scanning direction at high accuracy.

Moreover, since the number of data in a nonvolatile memory can be made less than a predetermined number of light quantities required, a memory with a smaller capacity can be used.

The above and other objects, effects, features and advantages of the present invention will become more apparent from the following description of embodiments thereof taken in conjunction with the accompanying drawings.

Further features of the present invention will become apparent from the following description of exemplary embodiments (with reference to the attached drawings).

BRIEF DESCRIPTION OF THE DRAWINGS

FIG. 8 is a table explaining the light quantity correction of the exposure apparatus of the embodiment 1 in accordance with the present invention;

FIG. 9 is a table explaining the light quantity correction of the exposure apparatus of an embodiment 2 in accordance with the present invention;

FIG. 11 is a table explaining Vref voltage setting of the embodiment 2 in accordance with the present invention;

FIG. 14 is a table explaining the light quantity correction data of the exposure apparatus of the embodiment 2 in accordance with the present invention;

FIG. 16 is a table explaining an example of the light quantity correction of the exposure apparatus of the embodiment 3 in accordance with the present invention;

FIG. 17 is a table explaining another example of the light quantity correction of the exposure apparatus of the embodiment 3 in accordance with the present invention; and FIG. 18 is a table explaining still another example of the light quantity correction of the exposure apparatus of the embodiment 3 in accordance with the present invention.

DESCRIPTION OF THE EMBODIMENTS

The invention will now be described with reference to the accompanying drawings.

Embodiment 1

Figure 1:
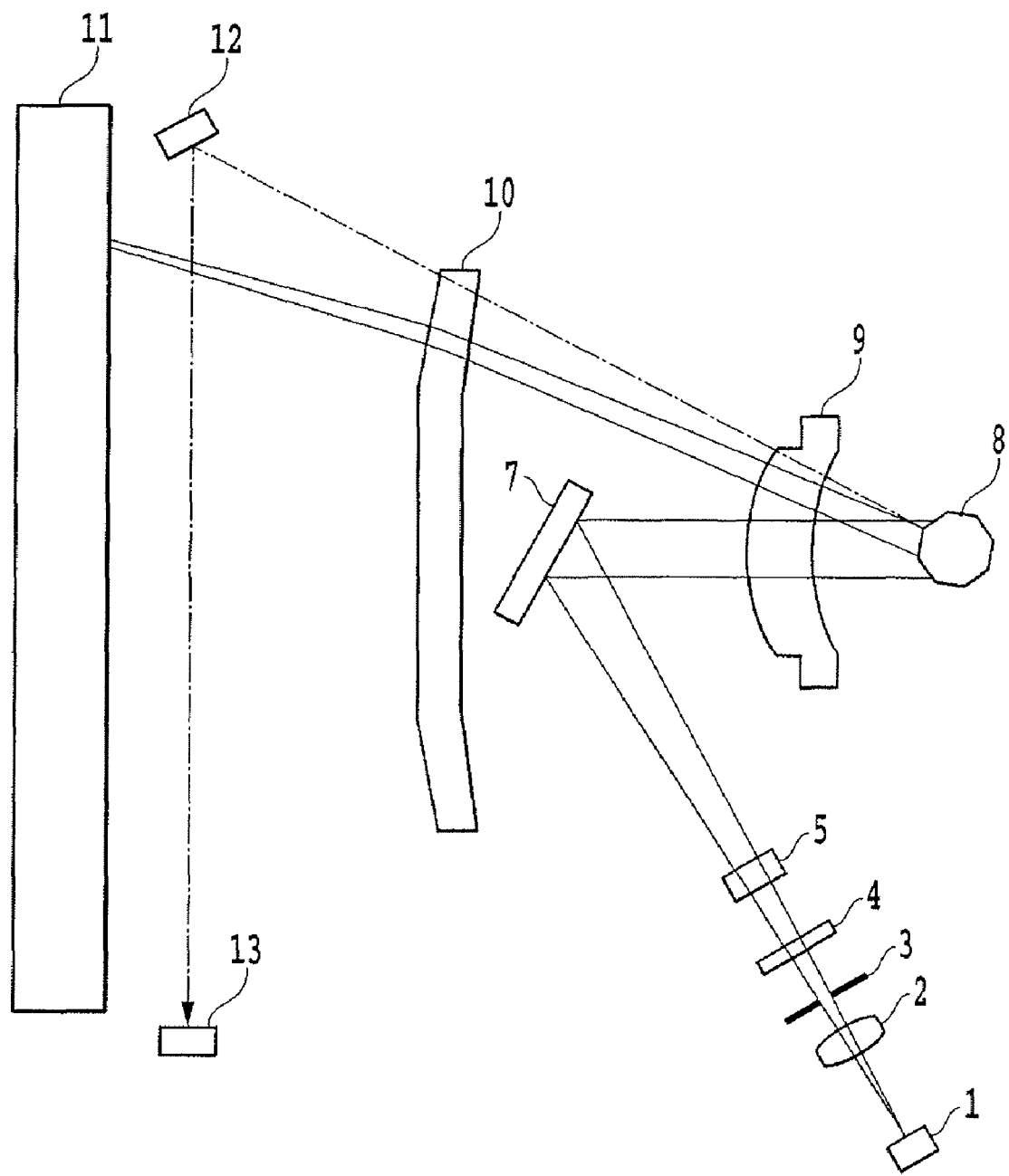
FIG. 1 is a diagram showing a configuration of an exposure apparatus in accordance with the present invention.

FIG. 1 is a diagram explaining an exposure apparatus in accordance with the present invention.

In FIG. 1, the reference numeral 1 designates a laser light source, 2 designates a collimator lens, 3 designates a diaphragm, 4 designates a main scanning expander lens, 5 designates a cylindrical lens, and 7 designates a reflection mirror. The reference numeral 8 designates a polygon mirror, 9 designates an fθ lens, and 10 designates an anamorphic aspheric lens having power primarily in the subscanning direction.

The laser light radiated from the laser light source 1 is made nearly parallel through the collimator lens 2, and undergoes beam regulation by the diaphragm 3. The beam is made into divergent rays in the main scanning direction through the main scanning expander lens 4. In addition, the laser light is condensed only in the subscanning direction through the cylindrical lens 5, is reflected by the reflection mirror 7, passes through the fθ lens 9, and is condensed linearly near the reflection planes of the polygon mirror 8. The condensed laser light is reflected by the polygon mirror 8. In this case, rotating at a constant rate, the polygon mirror 8 deflects the laser light.

The deflected laser light is incident upon the fθ lens 9 with fθ characteristics again to condense the ray bundle in the main scanning direction. The ray bundle passing through the fθ lens 9 is condensed in the subscanning direction by the anamorphic aspheric lens 10 having power in the subscanning direction, and forms a spot on the photosensitive body drum not shown via a reflecting mirror 11. The spot scans the photosensitive body drum in the axial direction to carry out the main scanning. The reference numeral 12 designates a reflecting mirror mounted on the edge in the main scanning direction. The reference numeral 13 designates a horizontal synchronization detecting element (BD sensor) provided for determining the write start timing of an image. The horizontal synchronization detecting element 13 receives the laser light from the laser light source 1 obtained via the reflecting mirror 12, and outputs a signal responding to the horizontal synchronization timing.

Figure 2:
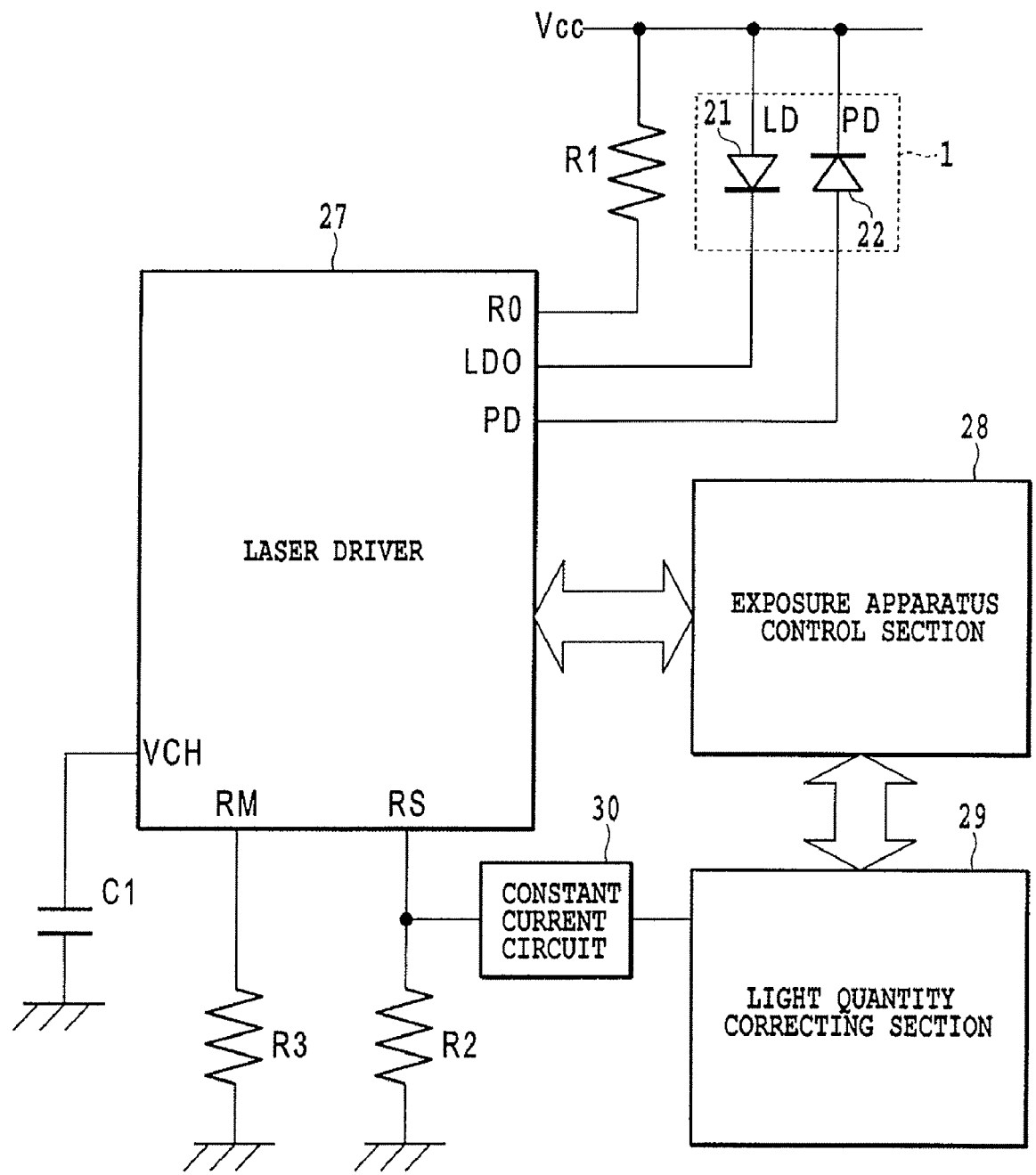
FIG. 2 is a block diagram showing a configuration of the exposure apparatus in accordance with the present invention.

FIG. 2 is a block diagram showing the control block of the exposure apparatus.

The semiconductor laser 1 has a semiconductor laser diode (LD) 21 and a photodiode (PD) 22 placed near the LD 21. The PD 22 receives the laser beam emitted from the LD 21, and outputs a current corresponding to the light quantity of the laser beam received. The LD 21 has its anode connected to a power supply Vcc, and its cathode connected to the LDO terminal of a laser driver IC 27 which is a laser control means. The PD 22 has its cathode connected to the power supply Vcc, and its anode connected to the PD terminal of the laser driver IC 27. A resistor R1 is connected between the power supply Vcc and the RO terminal of the laser driver IC 27. A resistor R3 is connected between a GND and the RM terminal of the laser driver IC 27. A capacitor C1 is connected between the GND and the VCH terminal of the laser driver IC 27. A resistor R2 is connected between the GND and the RS terminal of the laser driver IC 27.

Figure 7:
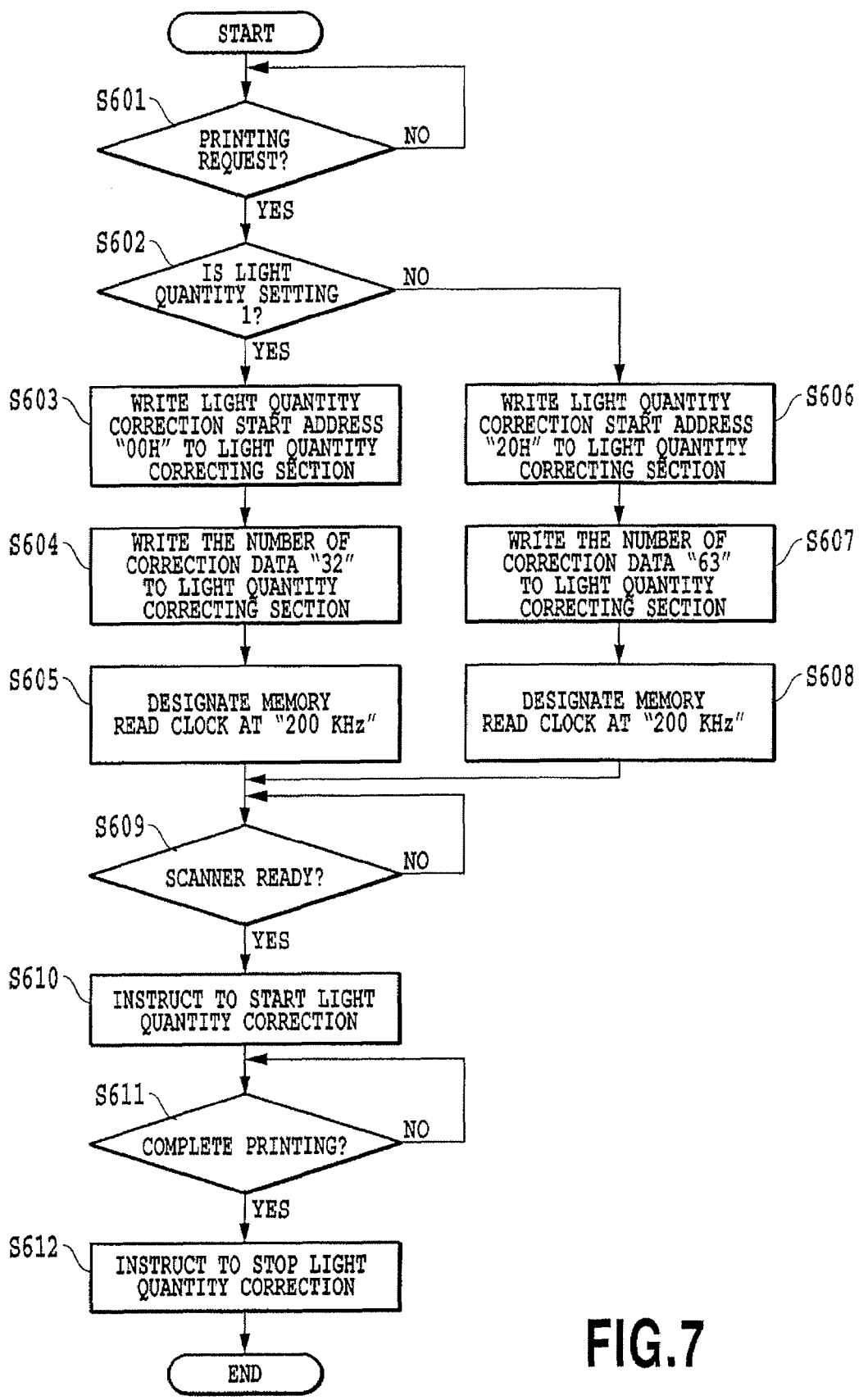
FIG. 7 is a flowchart illustrating the operation of the embodiment 1 in accordance with the present invention.
Figure 10:
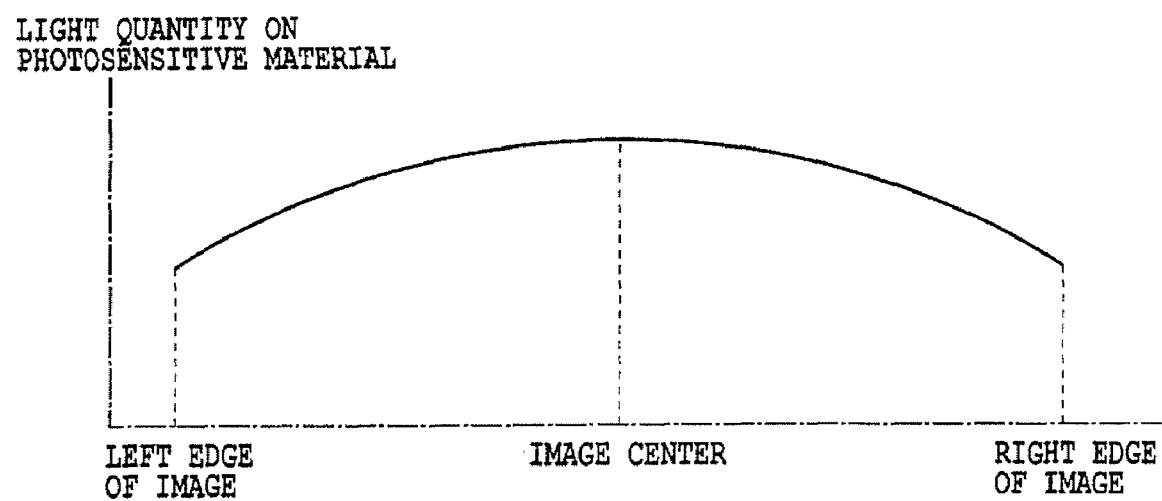
FIG. 10 is a diagram explaining light quantity distribution of an over filled optical system.
Figure 13:
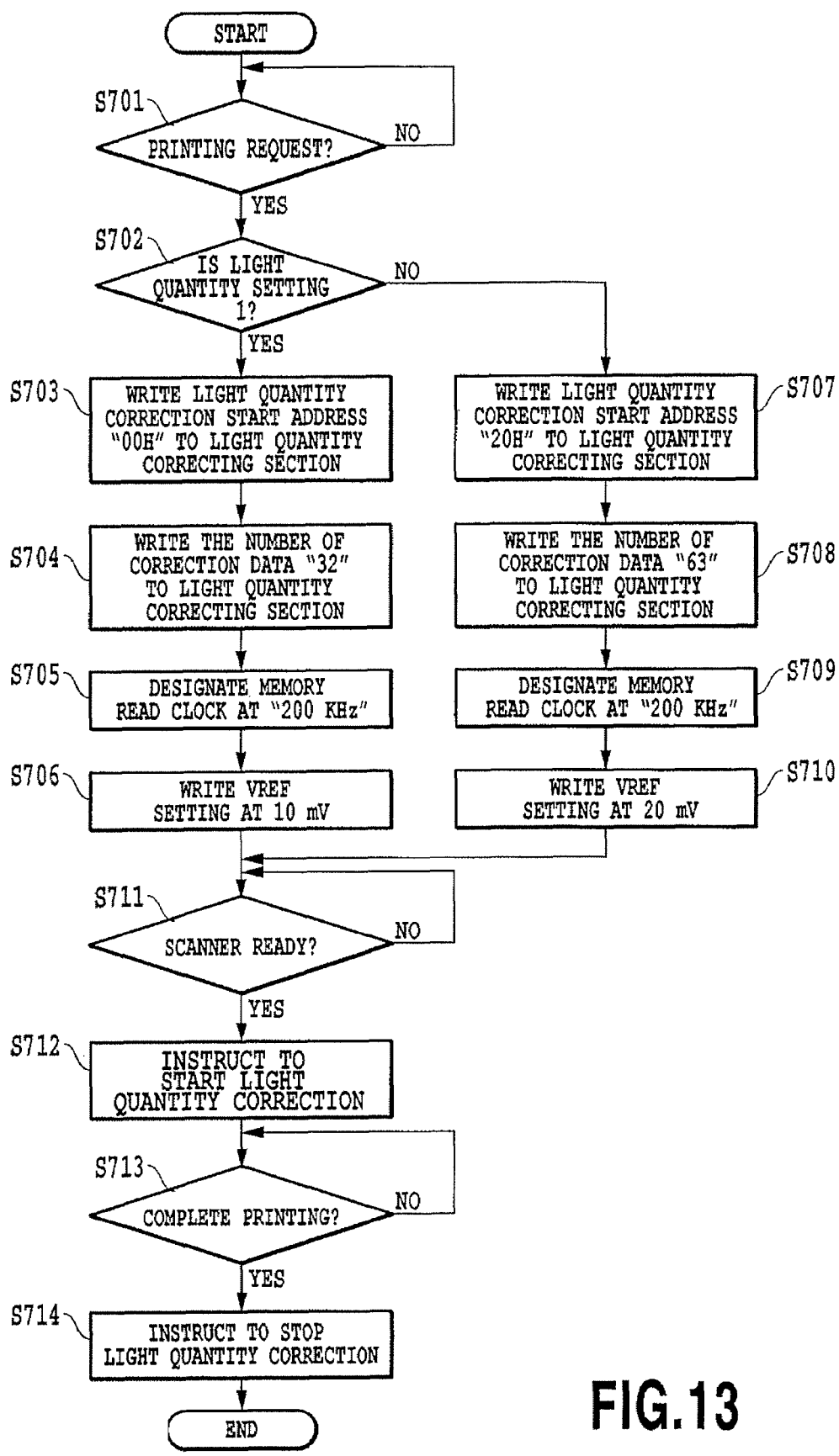
FIG. 13 is a flowchart illustrating the operation of the embodiment 2 in accordance with the present invention.

An exposure apparatus control section 28 carries out the control of the APC and laser switching. The exposure apparatus control section 28 has a CPU for carrying out the control, and a memory unit including the control procedure of the CPU (inclusive of the control procedure as shown in FIG. 7 and FIG. 13) and a workspace of the CPU. Further, the exposure apparatus control section 28 has a light quantity setting section. The light quantity setting section can set a plurality of light quantities. The light quantity setting section selects one of a plurality of light quantities in accordance with a designation from an image forming apparatus side and sets it.

The exposure apparatus control section 28 delivers the control signal and video signal to the laser driver IC 27. The output of a light quantity correcting section 29 is supplied to a constant current circuit 30 which converts it to a constant current. The constant current is supplied to the RS terminal of the laser driver IC 27 in such a manner as to maintain the light quantity on the scanning line at nearly constant on the photosensitive body drum not shown.

Figure 3:
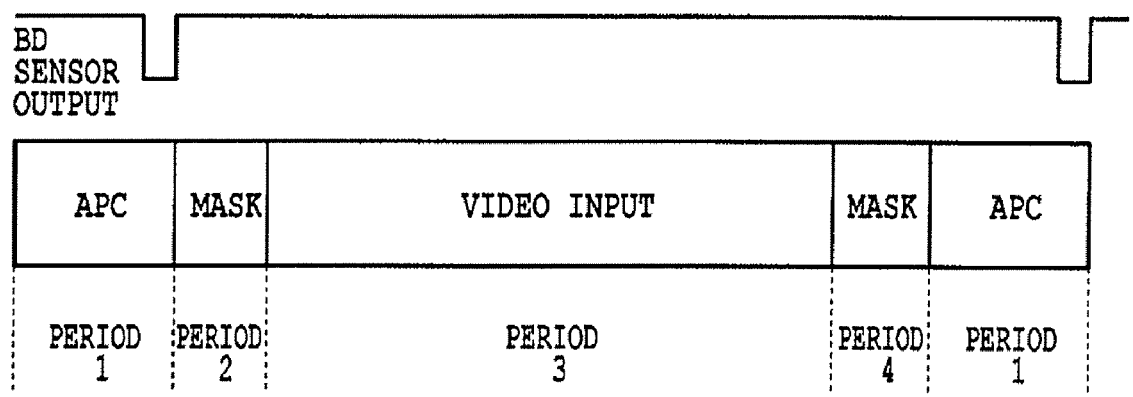
FIG. 3 is a timing chart illustrating an embodiment 1 in accordance with the present invention.

Next, a single scanning operation of the exposure apparatus control section 28 will be described with reference to FIG. 3.

In period (1), the exposure apparatus control section 28 instructs the laser driver IC 27 to carry out APC so that the laser driver IC 27 performs APC emission. Thus, the laser driver IC 27 has the LD 21 emit light, thereby causing a current to flow through the PD 22 in response to the emitted light quantity. The current flows from the RM terminal to the resistor R3. During the APC emission, the current of the LD 21 is adjusted in such a manner that the voltage at the RM terminal becomes a desired value. After the adjustment, the laser driver IC 27 carries out the current-to-voltage conversion of the current of the LD 21, and supplies the voltage to the VCH terminal. If an output (Low) from the BD sensor is obtained during the APC emission, the laser driver IC 27 terminates the APC emission immediately (or after a predetermined time period), and makes a transition to a mask state.

In period (2), the exposure apparatus control section 28 instructs the laser driver IC 27 to carry out mask control. According to the instruction, the laser driver IC 27 halts the emission of the LD 21, and supplies the resistor R1 and resistor R2 with a constant current determined by the voltage at the VCH terminal. The purpose of the current is to quicken the start-up of the LD 21. The duration of the period (2) is determined according to the time from the input of the BD sensor signal to the beginning of writing the image. It varies in accordance with paper size and with/without a border.

In period (3), the exposure apparatus control section 28 instructs the laser driver IC 27 to carry out video input. Thus, the laser driver IC 27 carries out the laser emission in response to image data (video signal). The laser driver IC 27 performs switching in such a manner that when the video input is True, the current flows through the LD 21, and when it is False, the current flows through the resistor R1.

In period (4), the mask state comes again. As for the timing, it varies in accordance with paper size and with/without a border as in the previous period (2).

With repeating the foregoing periods, the APC and BD detection are carried out at each scanning. Thus, the electrostatic latent image is formed on the photosensitive body drum.

Next, the light quantity correction will be described.

Figure 5:
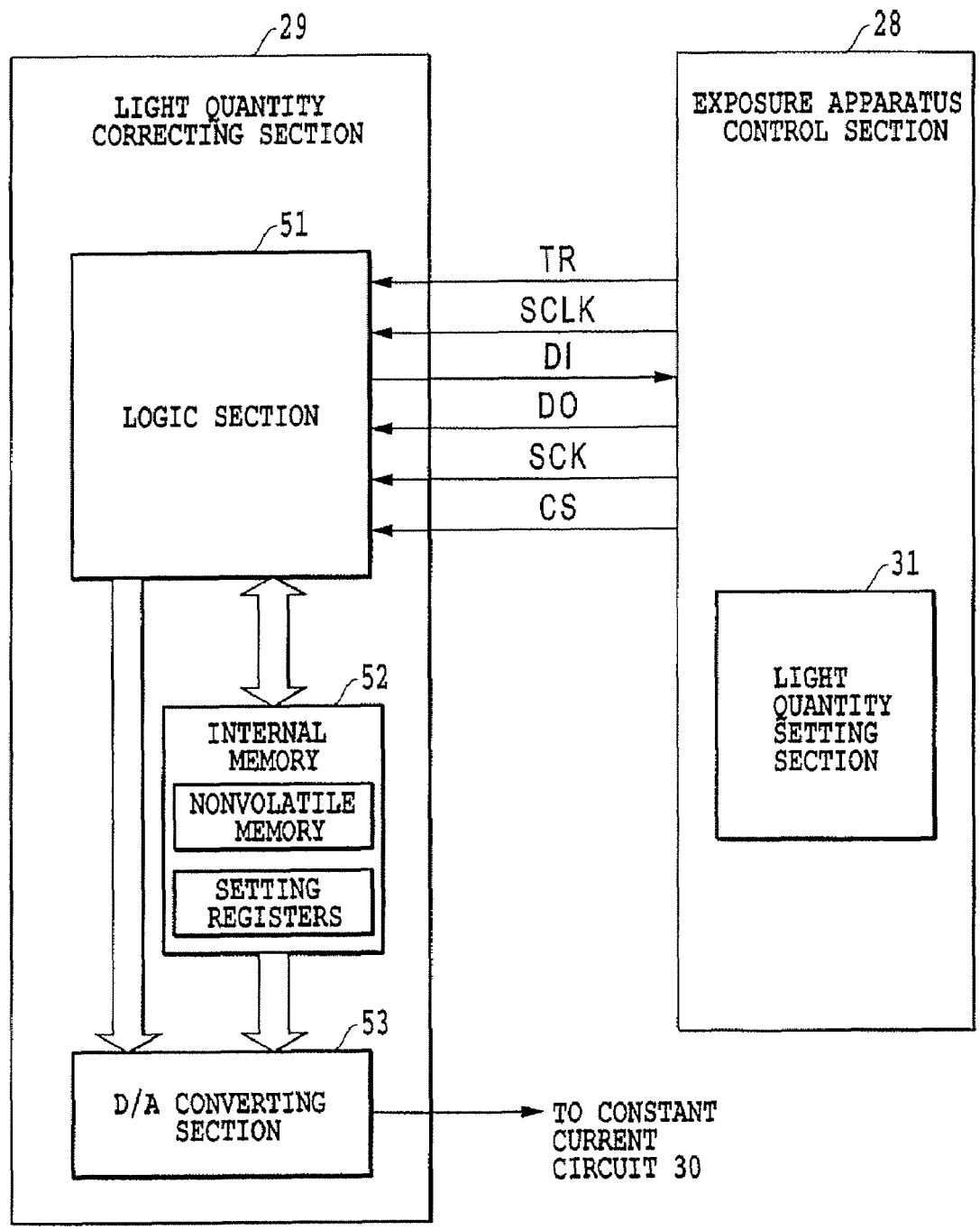
FIG. 5 is a block diagram explaining a control block of the exposure apparatus in accordance with the present invention.

FIG. 5 is a block diagram showing a configuration of the light quantity correcting section 29.

The light quantity correcting section 29 has a logic section 51, an internal memory 52 including a nonvolatile memory and a variety of setting registers, and a D/A converter (converting section) 53. The logic section 51 receives from the exposure apparatus control section 28 a trigger (TR) signal, operating clock (SCLK) signal, data out (DO) signal, data communication clock (SCK) signal, and select (CS) signal. On the other hand, the logic section 51 supplies the exposure apparatus control section 28 with a data in (DI) signal. In addition, the logic section 51 instructs the internal memory 52 to read and write, and the D/A converting section 53 to carry out its operation.

The nonvolatile memory in the internal memory 52 stores the correction data in digital values. The correction data are address mapped, and are transmitted to the D/A converting section 53 sequentially in response to the clock from the logic section 51. The D/A converting section 53 supplies the constant current circuit 30 with the correction voltage obtained by the analog conversion of the digital values corresponding to the correction data. Thus, the constant current corresponding to the correction voltage is supplied to the RS terminal.

Figure 4:
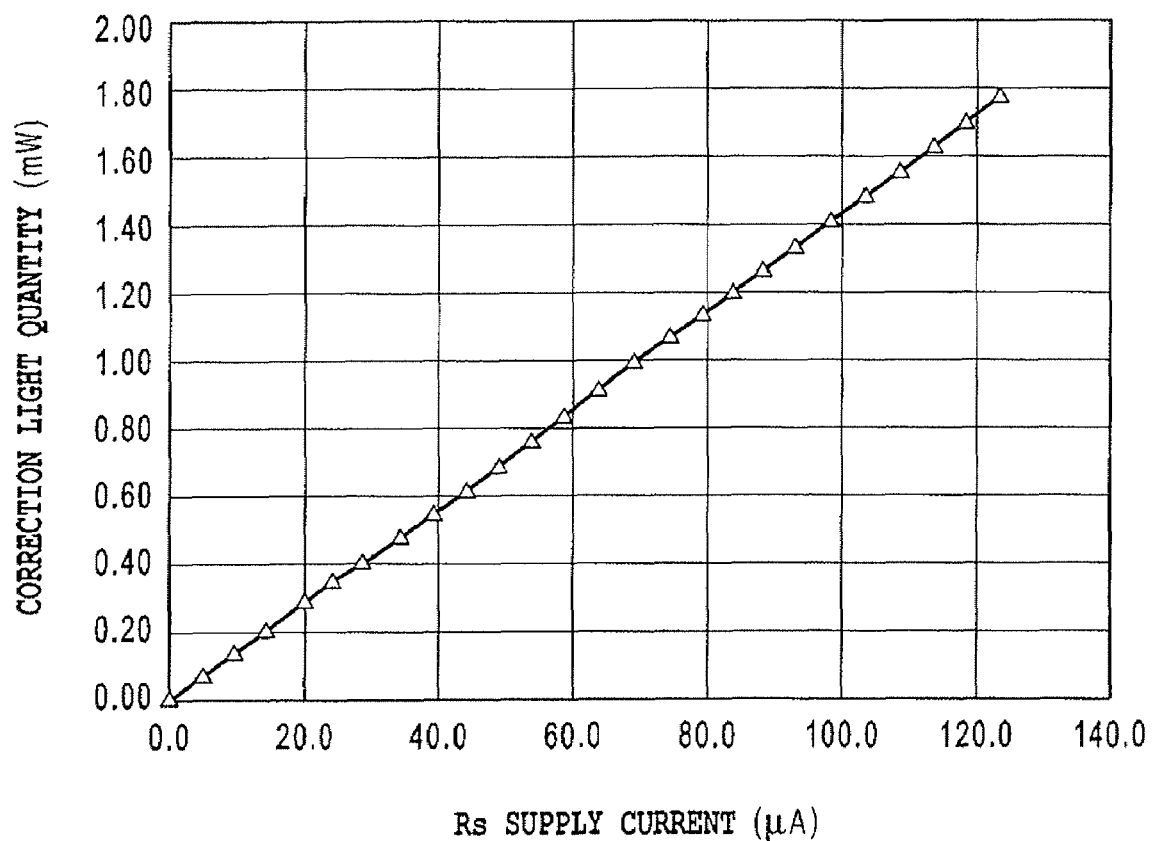
FIG. 4 is a diagram explaining light quantity correction of the exposure apparatus in accordance with the present invention.

FIG. 4 is a graph illustrating relationships between the current amount supplied to the RS terminal and the correction light quantity of the LD 21, in which the horizontal axis shows the RS supply current and the vertical axis shows the correction light quantity. The laser emission light quantity to be corrected is directly proportional to the current amount supplied to the RS terminal.

FIG. 7 is a flowchart illustrating the control the exposure apparatus control section 28 performs.

In response to a printing request at step S601, the exposure apparatus control section 28 makes a decision about the light quantity setting for the printing at the next step S602. For example, it makes a decision in accordance with the printing speed and the designation of the light quantity itself. The printing speed depends on the image forming apparatus using the exposure apparatus. The light quantity itself can be designated by the image forming apparatus side. The present embodiment selects and sets two types of light quantities in the light quantity setting section 31 in accordance with the designation. The two types of light quantities are light quantity setting 1; and light quantity setting 2. FIG. 8 shows the nonvolatile memory data of the light quantity correcting section 29 in this case. In FIG. 8, the unit of the RS supply current is μA, and the unit of pre-correction light quantity and post-correction light quantity is mW, which satisfy the relationships of FIG. 4. In the case of the light quantity setting 1, the data are assigned to addresses 0000h-001Fh; and in the case of the light quantity setting 2, the data are assigned to addresses 0020h-005Eh.

When the light quantity setting 1 is selected at step S602, the exposure apparatus control section 28 writes the light quantity correction start address "00H" into the light quantity correcting section 29 at step S603, and writes the number of correction data "32" at step S604. At the next step S605, the exposure apparatus control section 28 designates the clock for sequentially transferring the correction data to the D/A converting section 53 at 200 kHz.

In the present embodiment, since the number of data is 32 at 200 KHz, the light quantity correction is carried out for the duration 1/200 k×32=160 μsec. The clock frequency and the number of correction data are usually optimized in accordance with the resolution of the light quantity correction or to the rotation speed of the polygon mirror.

When the light quantity setting 2 is selected at step S602, the exposure apparatus control section 28 writes the light quantity correction start address "0020H" into the light quantity correcting section 29 at step S606, and writes the number of correction data "63" at step S607. At the next step S608, the exposure apparatus control section 28 designates the clock for sequentially transferring the correction data to the D/A converting section 53 at 200 kHz.

After completing steps S605 and S608, the exposure apparatus control section 28 waits until the scanner ready at the next step S609. The term "scanner ready" refers to a state in which the rotation rate of the polygon mirror reaches the rotation rate enabling printing, and the rotation becomes stable. For example, in response to the signal from the rotation control apparatus of the polygon mirror indicating that the rotation becomes stable, the exposure apparatus control section 28 makes a decision that it enters the scanner ready, and instructs the light quantity correcting section 29 to start the light quantity correction at step S610. Receiving the instruction, the light quantity correcting section 29 carries out the light quantity correction with making synchronization at each scanning in response to the signal from the BD sensor. Subsequently, the exposure apparatus control section 28 makes a decision as to whether the printing has been completed or not at step S611. If it makes a decision that the printing has been completed, it delivers a light quantity correction stop instruction to the light quantity correcting section at step S612, and terminates the control.

Figure 6:
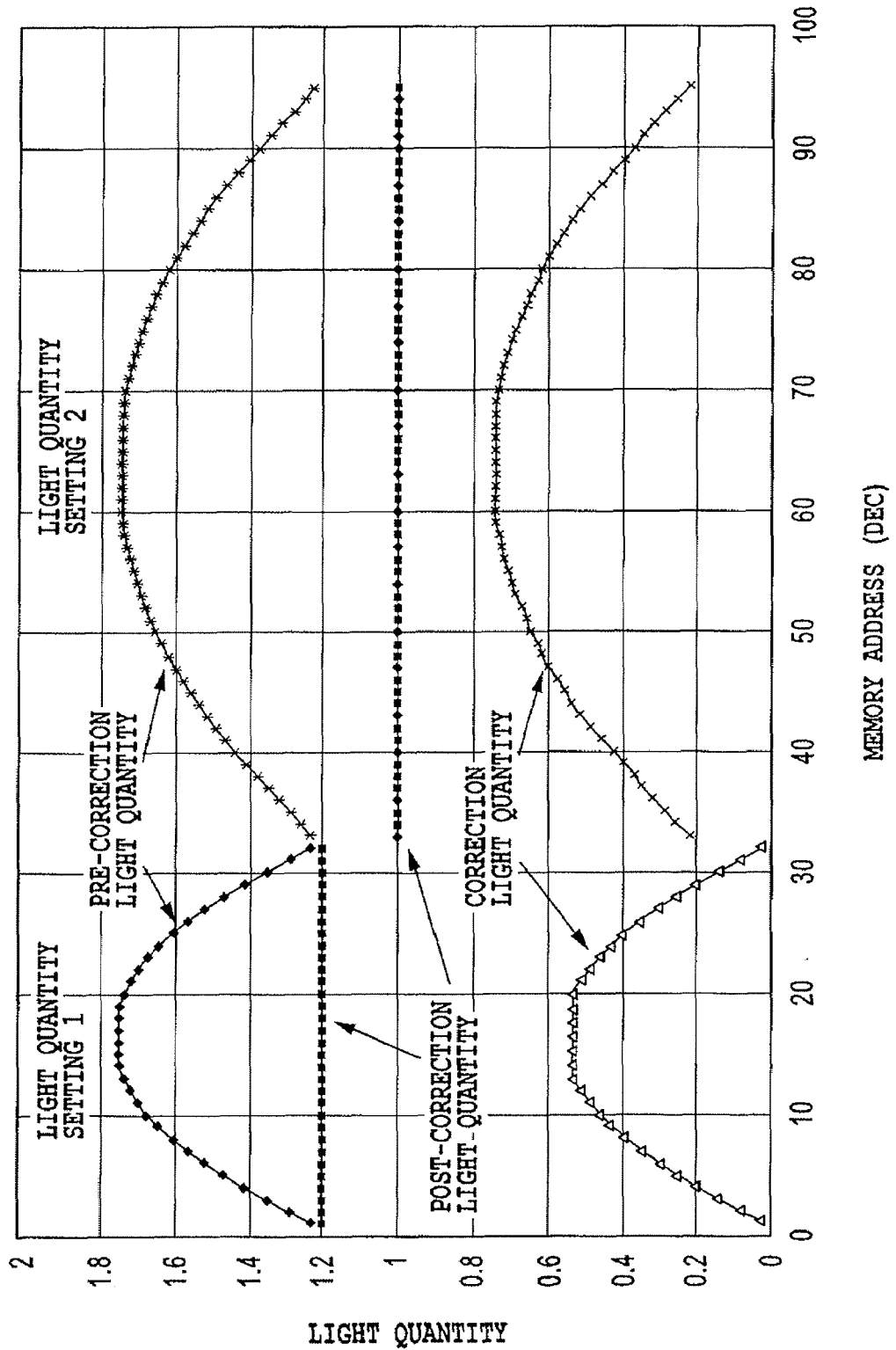
FIG. 6 is a diagram explaining light quantity correction of the exposure apparatus of the embodiment 1 in accordance with the present invention.

FIG. 6 illustrates this situations.

In the case of the light quantity setting 1, the resolution of the light quantity correction is divided into 32 divisions in the main scanning direction, and the correction is made in such a manner that the target light quantity becomes 1.2. In the case of the light quantity setting 2, the resolution of the light quantity correction is divided into 63 divisions in the main scanning direction, and the correction is made in such a manner that the target light quantity becomes 1.0. The resolutions are determined in advance depending on the light quantity, and as the correction data, the values measured in advance for each exposure apparatus are stored.

Although the present embodiment has two sets of the light quantity setting values, it can deal with a greater number of sets.

As described above, the present embodiment has the correction data corresponding to a plurality of light quantities. Accordingly, it can maintain the light quantity on the photosensitive body surface nearly constant in the scanning direction by selecting the reference correction data even when switching the target light quantity.

Embodiment 2

In the foregoing embodiment, the data stored in the memory are subjected to the digital-to-analog conversion without change. As a result, the voltage output has the same resolution for the data without exception.

In the present embodiment, the relationships between the resolution and the correction data are optimized before output.

The present embodiment will be described with reference to the drawings.

FIG. 9 is a table showing examples of data for carrying out correction for 40 data when the target light quantity on the photosensitive body is 250 μW. The table shows calculation results for each correction voltage target (in mV), when the output reference voltage Vref is 75 mV and 10 mV. As shown in FIG. 11, the output reference voltage Vref can be designated by 4-bit data, for example. Thus, it can be set at every 5 mV interval from 0000B to 1111B. Accordingly, the highest output voltage, that is, the greatest correction amount is 75 mV, and the output increases 75 mV at every increment of the correction data. Incidentally, when the correction data length is set at 6 bits, the maximum output voltage at each Vref setting becomes as shown in FIG. 11.

Figure 12:
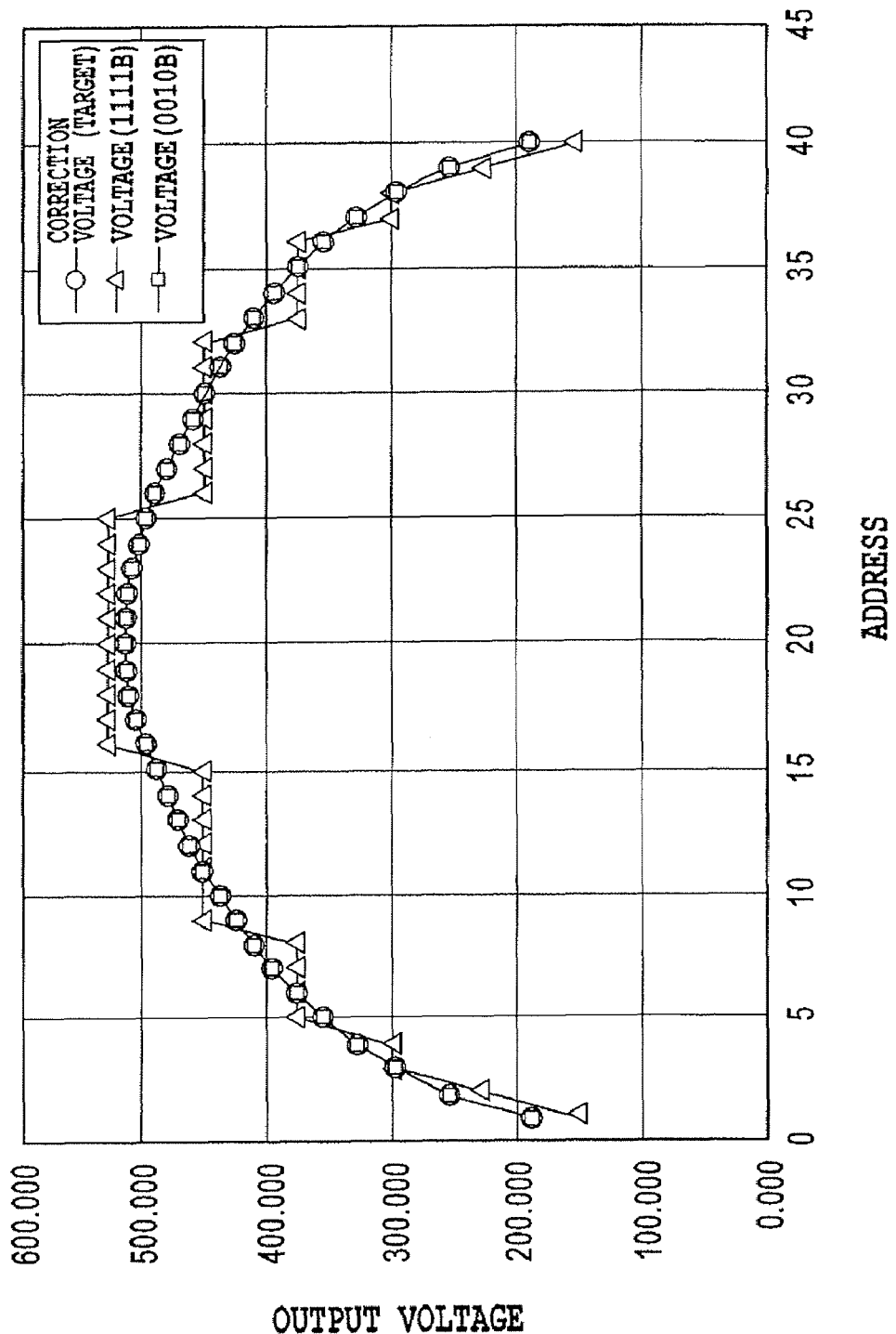
FIG. 12 is a diagram explaining light quantity correction of the exposure apparatus of the embodiment 2 in accordance with the present invention.

FIG. 12 is a graph illustrating the correction voltage target and the output voltage (mV) when the Vref is set at 75 mV, and the output voltage (mV) when the Vref is set at 10 mV. When the Vref is set at 75 mV, since the resolution for the correction data is coarse, the curve greatly differs from the target. In contrast, when the Vref is set at 10 mV, the curve is closer to the target output. In other words, it becomes possible to achieve more precise light quantity correction by setting the Vref at the minimum possible value to determine the correction data, thereby being able to draw a more ideal correction data curve.

FIG. 13 is a flowchart illustrating the control performed by the exposure apparatus control section 28 of the present embodiment. It differs from the control of the foregoing embodiment 1 only in steps S706 and S710. Since the remaining control is the same, its duplicate explanation will be omitted here.

At step S706, the exposure apparatus control section 28 selects the mode 1 light quantity setting. FIG. 14 shows the relationships between the addresses, memory data, and target light quantities. In FIG. 14, the unit of the RS supply current is μA, and the unit of the pre-correction light quantity and post-correction light quantity is mW. In the light quantity setting 1, the target light quantity is set at 250 μW, and the memory data are stored for the Vref voltage of 10 mV. The exposure apparatus control section 28 writes "0010B" into the Vref setting register to set the Vref voltage at 10 mV for the light quantity correcting section 29.

On the other hand, at step S710, the exposure apparatus control section 28 selects the mode 2 light quantity setting. In the light quantity setting 2, the target light quantity is set at 170 μW, and the memory data are stored for the Vref voltage of 20 mV. The exposure apparatus control section 28 writes "0100B" into the Vref setting register for the light quantity correcting section 29.

Incidentally, such a configuration is also possible in which the exposure apparatus control section 28 stores the Vref voltage corresponding to each light quantity setting in advance, and the light quantity correcting section 29 employs the data corresponding to the Vref values as its memory data. Alternatively, such a configuration is possible in which the light quantity correcting section 29 stores in a part of its memory the Vref value corresponding to each light quantity setting, and the exposure apparatus control section 28 reads the Vref value every time the light quantity is changed, and instructs the light quantity correcting section 29 as the Vref set.

Carrying out the foregoing control makes it possible to vary the resolution at the D/A conversion in accordance with the correction amount. This enables more accurate light quantity correction in the scanning direction.

Embodiment 3

The foregoing embodiment stores the data in the memory by the number of the light quantity settings, and varies the light quantity irradiated onto the photosensitive body by varying the correction light quantity by designating the data address to be read and the number of data. Accordingly, an increasing number of light quantity setting steps will increase the number of memory data.

In contrast, the present embodiment handles a control method capable of dealing with a plurality of light quantities with maintaining the number of data in the memory at a single set.

Figure 15:
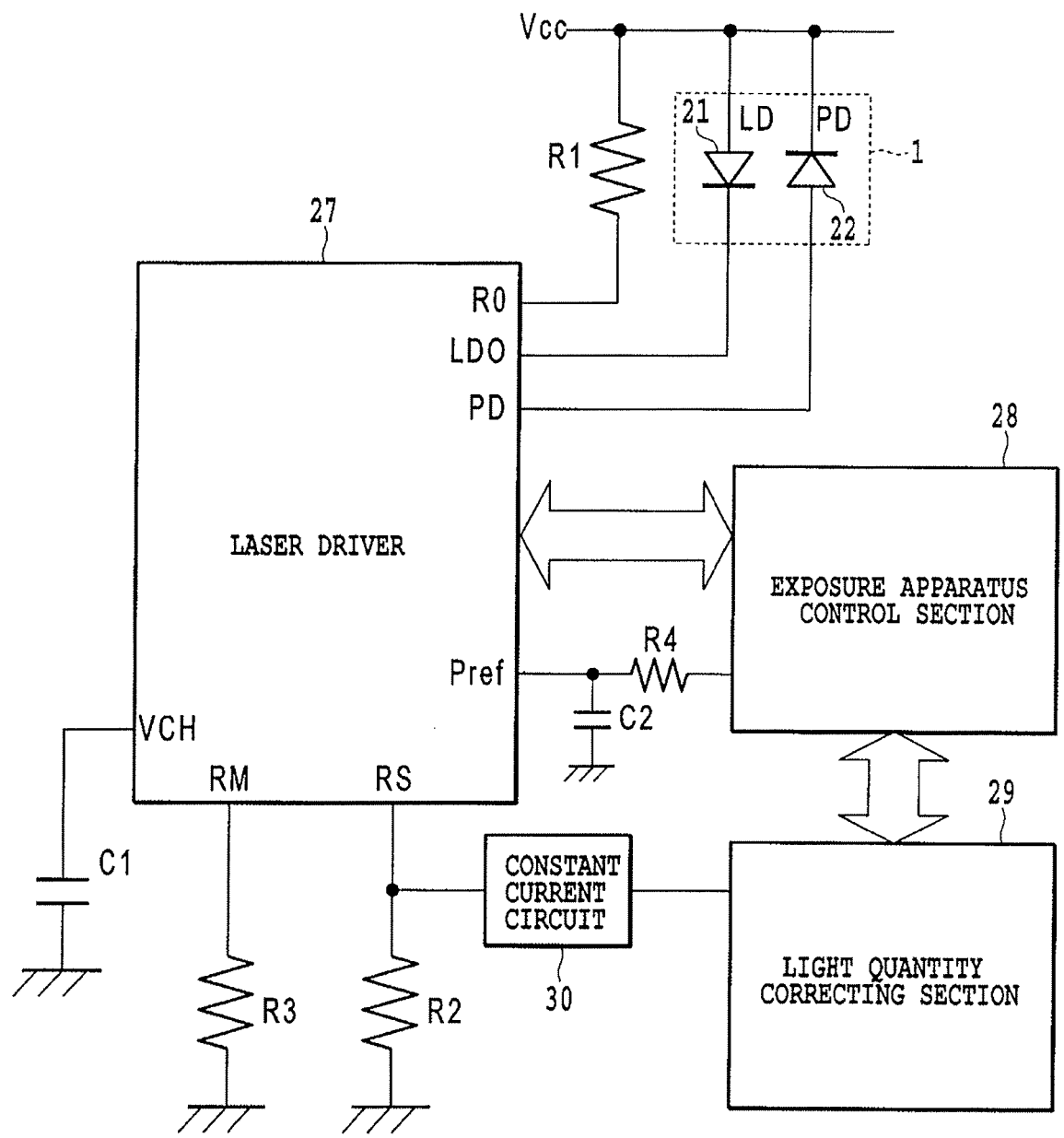
FIG. 15 is a diagram explaining blocks of the exposure apparatus of an embodiment 3 in accordance with the present invention.

FIG. 15 is a block diagram showing a configuration of the exposure apparatus of the present embodiment.

The present embodiment differs from the configuration of FIG. 2 described in the foregoing embodiment in that it has an input terminal Pref for setting the light quantity to the laser driver IC 27, and the remaining configuration is the same. The exposure apparatus control section 28 outputs a pulse-width modulation (PWM) pulse corresponding to the light quantity setting value, and supplies the input terminal Pref with the voltage smoothed by the resistor R4 and capacitor C2. The laser driver IC 27 carries out the APC control with reference to the voltage supplied to the input terminal Pref. Thus, the emission light quantity of the LD 21 is determined with reference to the voltage supplied to the input terminal Pref. The duty of the PWM pulses is directly proportional to the laser light quantity at the APC.

The light quantity setting in this case will be described.

Assume that it is necessary for the target light quantity on the photosensitive body to be set at one of the three values 150 µW, 250 µW and 300 µW, for example.

In this case, the memory of the light quantity correcting section 29 stores 20 data as shown in FIG. 16 as the light quantity correction data using as the reference the case that carries out the light quantity correction with setting the target light quantity on the photosensitive body at 250 µW.

Assume that the PWM duty when the target light quantity is 250 µW is 50%, then the PWM duty when the target light quantity is 150 µW is set at 30%, and the PWM duty when the target light quantity 300 µW is set at 60%. Varying the PWM duty in accordance with the changing rate of the target light quantity can vary the APC light quantity.

Accompanying this, the pre-correction light quantity at each target light quantity also varies in accordance with the changing rate of the PWM duty. The pre-correction light quantity corresponding to each target light quantity is shown in FIG. 16-FIG. 18.

Next, the designation of the voltage Vref at the correction will be described. Consider the case where the correction is carried out because the pre-correction light quantity changes. In this case, if the voltage Vref is fixed, the memory data used is the same so that the amount of correction is the same, resulting in the unevenness of the light quantity on the surface of the drum. In view of this, the voltage Vref is set in accordance with the changing rate to the reference target light quantity 250 µW. More specifically, when the voltage Vref when the target light quantity is 250 µW is 10 mV, it is set at 6 mV when the target light quantity is 150 µW, and at 12 mV when the target light quantity is 300 µW.

Since the correction voltage is the product of the voltage Vref and the data, the correction voltage for each target light quantity is determined. On the other hand, the conversion of the correction voltage into the correction current, and the conversion of the correction current into the light quantity are made at a fixed rate independently of the target light quantity. Subtracting the correction light quantity from the pre-correction light quantity by using the correction light quantity thus obtained makes it possible to provide uniform light quantity on the surface of the drum for each target light quantity.

The foregoing explanation can be described by the following expressions.

$$PA = APCref - Pth$$

where PA is the reference target light quantity;

APCref is the laser light quantity on the photosensitive body before correction at the reference case; and Pth is the laser correction light quantity at the reference case;

To increase the target light quantity by a factor of 1.2:

$$1.2 \times PA = 1.2 \times (APCref - Pth)$$
$$= 1.2 \times APCref - 1.2 \times Pth$$

Thus, it is obvious that the APC light quantity is to be multiplied by 1.2 and the laser correction light quantity is to be multiplied by 1.2.

Next, the clock will be described for transferring data to the D/A converter 53 in the light quantity correcting section 29. Generally, the reason for varying the target light quantity on the photosensitive body is that the laser irradiation duration per unit pixel varies as a result of having to change the rotation speed of the polygon mirror owing to the change of the printing speed of the image forming apparatus. To cope with this, it is necessary to change the number of data to the data length corresponding to this, or to change the clock for transmitting the memory data to the D/A converter in accordance with this.

This will be shown by the following expression.

$$HCLK = (\text{clock at reference time}) \times (\text{polygon rotation rate after change}) \div (\text{polygon rotation rate at reference time})$$

For example, assume that the rotation rate of the polygon mirror at the reference light quantity is 25000 rpm, and the transfer clock of the D/A converter of the light quantity correcting section is 500 kHz. Besides, assume that the polygon rotation rate after the change is 20000 rpm. Then, the transfer clock after the change is 400 kHz.

$$(500 \text{ kHz} \times 20000 \text{ rpm} \div 25000 \text{ rpm} = 400 \text{ kHz})$$

In this way, the light quantity distribution on the scanning plane can be made nearly constant in the following conditions for the single set of data and data length of the memory data. More specifically, the method is possible which determines the correction voltage by changing the APC light quantity and voltage Vref in accordance with the rate corresponding to the target light quantities, and which changes the data transfer clock of the D/A converter at the rate equal to the changing rate from the case of the polygon rotation rate that determines the memory data.

Although the foregoing description is made by way of example using the single set of memory data, this is not essential. It is obvious that when the polygon rotation rate varies sharply, even if another set of memory data is stored to improve the correction accuracy, the amount of the memory data can be reduced from the amount of the memory data at a predetermined number of light quantities required.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-037106, filed Feb. 14, 2006, which is hereby incorporated by reference herein its entirety.

What is claimed is:

1. An exposure apparatus comprising:

a light source for emitting a light beam with a light quantity corresponding to a current amount supplied;

a rotating polygon mirror with a plurality of reflection planes, said rotating polygon mirror rotating in a manner that the light beam emitted from said light source and reflected off a reflection plane scans on a photosensitive body;

beam magnifying means for expanding the light beam emitted from said light source in a manner that the light beam is irradiated onto said rotating polygon mirror with a beam width exceeding a width of each reflection plane of said rotating polygon mirror in a scanning direction;

correction current profile memory means for storing a plurality of correction current profiles that will provide the scanning direction with a nearly fixed light quantity of the light beam irradiated onto said photosensitive body;

setting means for selecting from a plurality of levels a target light quantity of the light beam irradiated onto the photosensitive body, and for setting the target light quantity selected; and current supplying means for selecting one of the plurality of correction current profiles stored in said correction current profile memory means in response to the target light quantity set by said setting means, and for supplying said light source with a current passing through correction based on the correction current profile selected, wherein said current supplying means comprises;

a D/A converter;

designating means for designating a transfer start address, a number of transfer data and transfer clock of the data in said correction current profile memory means in response to the target light quantity set by said setting means;

data supplying means for reading data in said correction current profile memory means in response to the information designated by said designating means, and for transferring the data to said D/A converter; and a constant current circuit for converting the output voltage of said D/A converter, which is obtained in response to the data transferred from said data supplying means, to a constant current, and for supplying the constant current to said light source.

2. The exposure apparatus as claimed in claim 1, wherein said D/A converter can set a conversion unit for the data input; and said current supplying means sets the conversion unit of said D/A converter in accordance with the target light quantity.

3. An exposure apparatus comprising:

a light source for emitting a light beam with a light quantity corresponding to a current amount supplied;

a rotating polygon mirror with a plurality of reflection planes, said rotating polygon mirror rotating in a manner that the light beam emitted from said light source and reflected off a reflection plane scans on a photosensitive body;

beam magnifying means for expanding the light beam emitted from said light source in a manner that the light beam is irradiated onto said rotating polygon mirror with a beam width exceeding a width of each reflection plane of said rotating polygon mirror in a scanning direction;

correction current profile memory means for storing a correction current profile that will provide the scanning direction with a nearly fixed light quantity of the light beam irradiated onto said photosensitive body;

setting means for selecting from a plurality of levels a target light quantity of the light beam irradiated onto the photosensitive body, and for setting the target light quantity selected; and current supplying means for generating correction information corresponding to the correction current profile stored in said correction current profile memory means in response to the target light quantity set by said setting means, and for supplying said light source with a current passing through correction in accordance with the correction information generated, at timing in response to the correction information, wherein said current supplying means comprises;

a D/A converter;

designating means for designating a transfer start address, a number of transfer data and transfer clock of the data in said correction current profile memory means in response to the target light quantity set by said setting means;

data supplying means for reading data in said correction current profile memory means in response to the information designated by said designating means, and for transferring the data to said D/A converter; and a constant current circuit for converting the output voltage of said D/A converter, which is obtained in response to the data transferred from said data supplying means, to a constant current, and for supplying the constant to said light source, wherein said correction current profile memory means further stores, when employing as a reference a first target light quantity corresponding to the correction current profile stored, a first conversion unit of said D/A converter, transfer clock to said D/A converter at the first target light quantity, and a first rotation of said rotating polygon mirror at the first target light quantity, and wherein said current supplying means, when said setting means changes the target light quantity from the first target light quantity to a second target light quantity, sets a second conversion unit of said D/A converter by multiplying the first conversion unit of said D/A converter by a rate equal to a changing rate between the second target light quantity and the first target light quantity, and varies the transfer clock to said D/A converter at a rate equal to a changing rate between a second rotation rate of said rotating polygon mirror after changing to the second target light quantity and the first rotation rate of said rotating polygon mirror at the first target light quantity.

* * * * *